Patented Nov. 21, 1922.

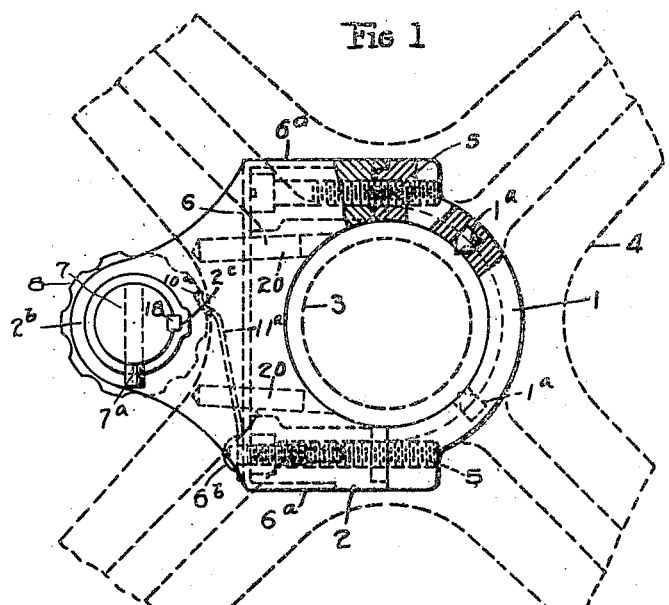

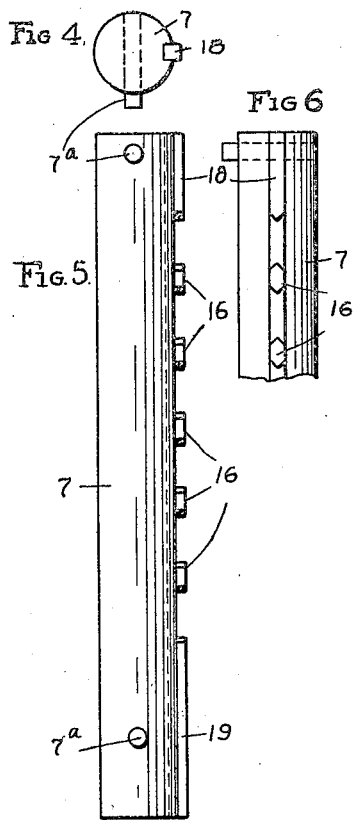

1,436,525

UNITED STATES PATENT OFFICE.

JOHN PFEIFER, OF SPRINGFIELD, OHIO, ASSIGNOR, BY DIRECT AND MESNE ASSIGNMENTS, TO THE SPRINGFIELD AUTO LOCK COMPANY, OF SPRINGFIELD, OHIO, A CORPORATION OF OHIO.

LOCK FOR MOTOR VEHICLES.

Application filed May 5, 1919. Serial No. 294,809.

*To all whom it may concern:*

Be it known that I, JOHN PFEIFER, a citizen of the United States, residing at Springfield, in the county of Clark and State of Ohio, have invented certain new and useful Improvements in Locks for Motor Vehicles, of which the following is a specification.

This invention relates to improvements in locks, and more particularly relates to a lock for the purpose of locking the steering wheel of a motor vehicle.

The object of the invention is to provide a lock of the character described which may be readily applied to the steering post of a motor vehicle and which when installed may be easily and quickly manipulated to lock or unlock the steering wheel of the steering mechanism to prevent theft of the vehicle.

A further object of my invention is to provide a lock which will be simple in construction and effective in its operation, and also one which embodies in its construction permutation locking mechanism so arranged as to not only lock the steering wheel but also to form a bar against the removal of the securing devices for the clamping members.

In the accompanying drawings:—

Fig. 1 is a top plan view of my improved lock showing a portion of the steering wheel and its post in dotted lines.

Fig. 2 is a side view of the same, partly broken away and shown in section.

Fig. 3 is a front view of the lock with a portion of the sealing plate broken away.

Fig. 4 is an end view of the locking bolt.

Fig. 5 is a side view of the bolt.

Fig. 6 is a view of the rear side of a portion of the bolt.

Fig. 7 is a top plan of one of the members of the permutation locking mechanism.

Fig. 8 is a top plan of a portion of the same, the inner locking ring being removed in this figure.

Fig. 9 is a vertical section of the part shown in Fig. 8.

Fig. 10 is a vertical section of several elements of the permutation locking mechanism showing the parts in unlocked position.

Fig. 11 is a top plan of one of the inner locking rings.

Fig. 12 is a side view of the same.

Fig. 13 is an enlarged sectional view of the locking sleeves and rings with the locking bolt in position therein, the upper and intermediate sleeves and rings being shown in their locking positions and the lower sleeve and its ring in unlocking position.

Referring to the drawings, 1 and 2 represent two members of a clamp, semi-cylindrical in shape so as to conform to the contour of the steering post 3 (shown in dotted lines) of the steering wheel 4 of a motor vehicle; the meeting edges of the two clamping members being shouldered as indicated in Fig. 2 so as to overlap to form a protecting wall for the securing devices for the same to be described. The member 2 has forwardly-extending top and bottom flanges 2$^a$ formed integrally therewith and these top and bottom flanges have centrally arranged integrally formed apertured ears 2$^b$.

Extending through the walls of the clamping member 2 into the clamping member 1 are screws 5 which secure the two members of the clamp firmly together about the post. Placed over the front edges of the walls of the member 2 is a cover plate 6, this cover plate being of a U-form so as to provide sides 6$^a$ which fit against the sides of the walls of the clamping member 2 which are recessed for the purpose of receiving these sides 6$^a$. Screws 6$^b$ extending through the cover 6 into the walls of the member 2 hold the cover in position, but other means are also provided for preventing the removal of this cover and obtaining access to the screws 5 which will be hereinafter explained in connection with the permutation locking mechanism.

A locking bolt 7 is slidably mounted in the apertured ears 2$^b$. About this bolt and between the ears are locking devices for the same. These locking devices consist of a series of outer sleeves 8, three in number in the present case, each provided with an inner ring 9. Each sleeve 8 is provided with equally spaced indications from 0 to 9 as shown and between each indication is a vertical groove 10, these rounded grooves co-operating with spring fingers 11$^a$ on the plate 11 which is held in position on the cover 6 by the screws 6$^b$ previously referred to; the spring fingers 11$^a$ having their outer ends bent at a slight angle so as to wipe over the respective sleeve 8 and co-operate with the grooves to act as clickers. One of the grooves 10 is provided with a straight face at one side thereof as indicated at 10ª in Figs. 7 and 8 so as to co-operate with the extreme ends of the clicker arms and act as stops for the sleeves so that the sleeves may be turned back and stopped at zero for the purpose of finding the combination by observing the number of clicks.

Each sleeve 8 has an integrally-formed inner flange 12 at its lower end provided with a series of equally spaced vertical openings 13, in the present case twenty of these openings being provided. In the two upper sleeves this flange projects below the lower edge thereof, as shown in Figs. 9, 10 and 13 so as to telescope with the under sleeve. Each of the rings 9 is fitted to the interior of its corresponding sleeve 8, resting upon the flange 12. In the upper sleeve 8 this ring may be of a length equal to the distance between the upper end of the sleeve 8 and its flange 12, but in the intermediate and lower sleeves the ring is shorter so as to accommodate the flange of the sleeve immediately above it. Each ring 9 has a downwardly-extending pin 14 so positioned that when the ring is inserted in its sleeve the pin will be caused to enter any one of the openings 13 so as to hold the ring in fixed relation with the sleeve so far as revoluble movement is concerned. Each ring 9 also has diametrically opposite the pin, a vertically-extending interior slot 15. The extreme upper portion of the upper ring is formed with an enlarged bore as indicated at 9ª so that the upper edge thereof may stand flush with the upper edge of its sleeve 8 so that when the sleeves and rings are in assembled position between the ears 2ᵇ, they will be held against any vertical displacement; this construction leaving the grooved portion of said upper ring of the same size as that of the two other rings for a purpose to be explained.

The locking bolt 7 is provided with a series of aligned projections 16, in the present case 5 in number, and also at the upper and lower ends with ribs 18 and 19 in alignment with the projections, the ends of the projections and ribs being beveled as shown. Each of the ears 2ᵇ has a vertical slot 2ᶜ cut in the inner bore of the aperture therethrough, these grooves being aligned and in the present case being centered on the transverse axes of the apertures. The distance between the respective ribs and the adjacent projections and also between the projections is equal to or slightly greater than the width of the intermediate and lower rings and of the grooved portion of the upper ring. When the parts are in assembled position and the grooves 15 are in alignment with each other, as shown in Fig. 10, and also with the ribs and projections on the bolt, the bolt may be moved vertically to or from locking position; the bolt being extended between two of the spokes of the steering wheel to lock the same. To lock the bolt the sleeves 8 are turned to bring the solid portions of the rings in alignment with the projections on the bolt and to unlock the bolt it is then necessary to turn the sleeves back to the proper point to again align the grooves in the rings with each other and with the projections and ribs, the point to which these sleeves are turned being determined by the combination. It should be explained that the bolt 7 is provided at each end with a stop 7ª, one or both of which may be removable and that when the bolt is at its extreme upper or lower position as determined by these stops, the intermediate and lower rings and the grooved portion of the upper ring will be in alignment with the spaces between the projections and ribs of the bolt so that the sleeves and their rings may be turned about the bolt for the purpose of locking or unlocking the same. In addition to the groove 15 in each of the rings, these rings are also provided with a series of equally spaced shallow recesses 9ᵇ on both their upper and lower edges, nine in number, which, with the grooves 15 correspond to the indications on the sleeves 8. These notches or recesses 9ᵇ are for the purpose of "foolers" to prevent the finding of the groove 15 by the slight up and down movement allowed by the bolt when in locked position.

In order to set the combination, assuming that the combination is 9 5 1, as shown in Fig. 3, the pin on the upper ring will have been placed in the opening 13 opposite the indication 9 of its sleeve, the pin on the intermediate ring will have been placed in the opening 13 opposite the indication 5 of its sleeve and the pin on the lower ring will have been placed in the opening opposite the indication 1 of its sleeve. By then turning all the sleeves so as to read 9 5 1 downwardly, all the grooves will be aligned with each other and also with the projections and ribs on the bolt, thus unlocking the bolt. The combination can be changed at any time by removing the sleeves and changing the position of the rings with respect thereto. If desired the pins of the rings may be placed in an opening intermediate any two indications on the sleeves so that half numbers may be secured in the combination, and that is the reason why twenty of the openings 13 are provided.

By the arrangement shown, it will be seen that it will be impossible to remove the sealing plate 6 to obtain access to the clamping screws 5 because of the location of the locking mechanism in close proximity thereto and because of the U-shaped form of the plate, as in order to remove the plate the side 6ª thereof must clear the walls of the clamping member 2.

In Figs. 1 and 2, the clamping member 1 is shown provided with inserted pointed pins 1ª, the pointed ends of which project slightly on the interior thereof so as to impinge or dig into the steering post and prevent the clamp being hammered down on the post to an extent to unlock the wheel. In Fig. 1, there is also shown in dotted lines two hardened pins 20 which are inserted into each of the ears 2ᵇ to prevent the ears from being sawed off. It might also be stated that the bolt is of hardened steel as is also the sealing plate 6.

Having thus described my invention, I claim:—

1. In a lock of the character described, a pair of clamping members, devices for securing said members together about the steering column of a motor vehicle, removable locking mechanism, operable to lock the steering wheel of said vehicle, carried by one of said clamping members, and a removable plate for sealing said devices located on the same clamping member, said plate being independent of and free from said locking mechanism, said locking mechanism being located on the outside of said plate and in proximity thereto so as to prevent the removal thereof when said mechanism is in operative position.

2. In a lock of the character described, a pair of clamping members having semi-cylindrical clamping faces surrounding the steering column of a motor vehicle, removable screws for securing the same together, removable locking mechanism carried by one of said clamping members, operable to lock the steering wheel of said vehicle, and a plate carried by the same clamping member for sealing the heads of said screws, said plate being independent of and free from said locking mechanism, said locking mechanism being located on the outer side of said plate and in proximity thereto so as to prevent the removal thereof when said locking mechanism is in operative position.

3. In a lock of the character described, a pair of clamping members, devices on the interior thereof for securing the same together about the steering column of a motor vehicle, projecting ears on one of said clamping members, removable locking mechanism operable to lock the steering wheel of said vehicle carried between said ears, and a removable plate on the same clamping member for preventing access to said securing devices, said plate being independent of and free from said locking mechanism, said locking mechanism being located on the outside of said plate and in proximity thereto so as to prevent the removal thereof when said mechanism is in operative position.

4. In a lock of the character described, a pair of clamping members, devices for securing said members together about the steering column of a motor vehicle, a slidable bolt carried by one of said clamping members operable to lock the steering wheel of said vehicle, together with permutation locking devices on said bolt to lock the same, and a removable plate carried by the same clamping member to seal said securing devices, said plate being independent of and free from said bolt and its locking devices, said bolt and its locking devices being disposed on the outside of said plate in a manner to prevent its removal so long as said bolt and locking devices are in operative position.

5. The combination of clamping members, securing devices for same, a movable member, locking means on said clamping members for holding said movable member against movement, concealing means for said securing devices associated with said locking means and so arranged that said locking means will prevent access to said concealing means and said concealing means will prevent access to said securing devices until the entire locking means is dismantled.

6. The combination of supporting members, securing means for holding same in position, a movable member, locking devices on said supporting members for holding said movable member against movement, an intermediate member for concealing said securing means, located in proximity to said locking devices, said locking devices blocking the movement of said intermediate member and thereby preventing access to said securing means until the locking devices are dismantled.

In testimony whereof, I have hereunto set my hand this 3rd day of May, 1919.

JOHN PFEIFER.

Witness:
 CHAS. I. WELCH.